C. L. SHEPARDSON.
LATHE AND SHAPER TOOL HOLDER.
APPLICATION FILED MAR. 18, 1920.

1,373,363.

Patented Mar. 29, 1921.

Inventor
C. L. Shepardson.

By Geo. P. Kimmel
Attorney

UNITED STATES PATENT OFFICE.

CLYDE L. SHEPARDSON, OF IONIA, MICHIGAN.

LATHE AND SHAPER TOOL HOLDER.

1,373,363. Specification of Letters Patent. Patented Mar. 29, 1921.

Application filed March 18, 1920. Serial No. 366,882.

*To all whom it may concern:*

Be it known that I, CLYDE L. SHEPARDSON, a citizen of the United States, residing at Ionia, in the county of Ionia and State of Michigan, have invented certain new and useful Improvements in Lathe and Shaper Tool Holders, of which the following is a specification.

This invention relates to improvements in tool holders and the principal object thereof is to provide a tool holder which is adjustable and reversible so that many different types of machine tools may be held therein.

In order to clearly define the objects and construction of the present invention it is pointed out that heretofore different tools have necessitated the utilization of different tool holders such as straight shank, left hand and right hand off-set, left hand and right hand straight shank and turning tool, round cutting tool holder, thread tool, left hand side tool and many others. The present tool holder is designed to securely and firmly grip tools which widely vary in type so that the usual loss of time and additional labor in changing tools and tool holders will be eliminated.

Another object of the invention is to provide improved and reversible means for clamping a tool in the holder so that a number of tools of different sizes and shapes may be rigidly held therein.

For the purpose of illustrating this invention, there is shown in the accompanying drawing one form thereof which is at present preferred, since the same has been found in practice to give satisfactory and reliable results, although it is to be understood that the various instrumentalities of which the invention consists can be variously arranged and organized and that the invention is not limited to the precise arrangement and organization of these instrumentalities as herein shown and described.

In the drawing.

Like characters of reference indicate like or similar parts throughout the several views of the drawings in which.

*a* designates the shank of the tool holder which is designed to be gripped in the tool post of a shaper or lathe, and B is the substantially rectangular head portion thereof which is provided with a serrated clamping face 1. Extending centrally through the head B is an opening 2 in which the screw threaded shank 3 of a stud 4 is retained.

Figure 1:
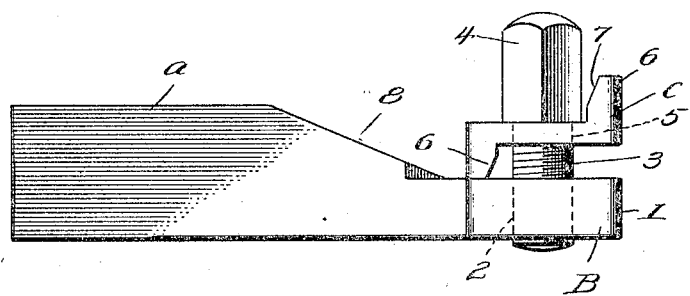
Figure 1 is a side elevation of the invention.

The clamping member C is provided with an opening 5 through which the shank 3 of the stud 4 extends and has formed thereon a pair of blocks 6 extending in reverse direction to each other from opposite ends of the clamping member. These blocks are designed to balance the other end of the clamp when a tool is in the holder and are of different sizes as is shown clearly in Fig. 1 so that the clamp may be reversed to adapt it for use with different sized tools. The inner faces of the blocks are cut away as at 7 to permit the stud to be inserted through the opening 5 and screwed down to securely clamp a tool D in place, as is illustrated in Fig. 2.

Figure 2:
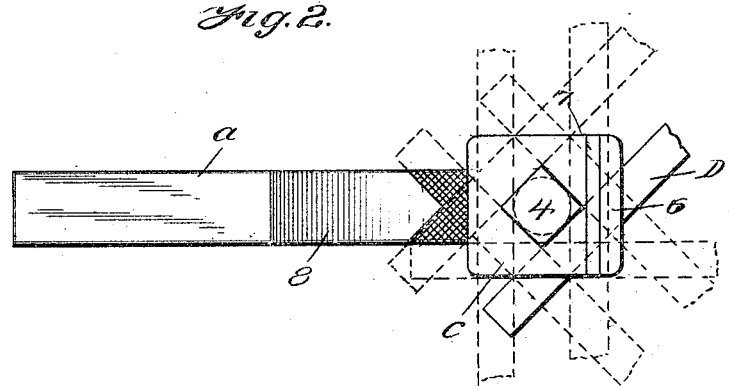
Fig. 2 is a top plan view of the same showing a tool clamped therein.
Figure 3:
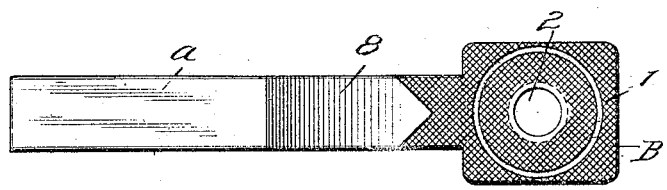
Fig. 3 is a top plan view of the tool holder with the clamping block removed.

As illustrated in dotted lines in Fig. 2 a number of different types of tools may be held at varying angles by the present tool clamp, and the peculiar formation of the clamping member, which is reversible, permits of using the tool holder with many of the types of tools which at present necessitate different types of tool holders. In order to prevent the shank of tools from engaging the shank of the tool holder, the tool holder is cut away as at 8 to permit passage of the shanks of tools thereby and also to prevent engagement of the tool shanks with the tool holder when the shank of the tool lies adjacent thereto.

In operation the clamping member C is adjusted upon the tool to be clamped which is inserted under the outward facing block 6 while the other block 6 engages the head B of the tool holder and balances the clamp, the stud 4 being screwed down, whereupon the tool will be securely held in position for operation upon the work.

The preferred embodiment of the invention is disclosed in the drawings and set forth in the specification, but it will be understood that any modifications within the scope of the claims may be made in the construction without departing from the principle of the invention or sacrificing any of its advantages.

What is claimed is:

1. A tool holder comprising a shank having a head thereon, a reversible clamping member adjustably mounted on said head, and blocks on the opposed faces of the clamping member for supporting it in position to facilitate the insertion of a tool and to balance the other end of the clamp when a tool is in the holder, said blocks being of different sizes to adapt the clamp to be used with different sized tools.

2. A tool holder comprising a shank having a head, a clamping member adjustably mounted on said head, and oppositely projecting means on the opposed faces of the clamping member for supporting said member in position to facilitate the insertion of a tool and to balance the other end of the clamp when a tool is in the holder and adapting the clamp to be reversed.

3. A tool holder comprising a shank having a serrated head, a reversible clamping member, a stud extending through said member and engaging said head for adjusting the clamping member with respect to a tool, and means on the clamping member for supporting it in position to facilitate the insertion of a tool and to balance the other end of the clamp when a tool is in the holder.

4. A tool holder comprising a shank, a head on the shank, one face of the head provided with serrations, a reversible clamping member, a stud extending through the clamping member and engaging in the head for adjusting the clamping member with respect to a tool, and a pair of blocks on the clamping member and extending in reverse directions to each other from opposite ends of the clamping member for supporting the same in position to facilitate the insertion of a tool.

In testimony whereof, I affix my signature hereto.

CLYDE L. SHEPARDSON.